(12) United States Patent
Ylinen

(10) Patent No.: US 9,298,792 B2
(45) Date of Patent: Mar. 29, 2016

(54) DATABASE SYNCHRONIZATION

(75) Inventor: Heikki Ylinen, Espoo (FI)

(73) Assignee: Seven Networks, LLC, Marshall, TX (US)

(*) Notice: Subject to any disclaimer, the term of this patent is extended or adjusted under 35 U.S.C. 154(b) by 457 days.

(21) Appl. No.: 11/296,255

(22) Filed: Dec. 8, 2005

(65) Prior Publication Data

US 2006/0149794 A1    Jul. 6, 2006

Related U.S. Application Data

(60) Provisional application No. 60/651,080, filed on Feb. 9, 2005.

(30) Foreign Application Priority Data

Dec. 10, 2004  (FI) .................................... 20045472

(51) Int. Cl.
```
G06F 15/16    (2006.01)
G06F 17/30    (2006.01)
H04L 12/28    (2006.01)
```

(52) U.S. Cl.
CPC ................ *G06F 17/30578* (2013.01)

(58) Field of Classification Search
USPC ......................................................... 709/221
See application file for complete search history.

(56) References Cited

U.S. PATENT DOCUMENTS

| | | | |
|---|---|---|---|
| 4,831,582 A | 5/1989 | Miller et al. | |
| 4,875,159 A | 10/1989 | Cary et al. | |
| 4,897,781 A | 1/1990 | Chang et al. | |
| 5,263,157 A | 11/1993 | Janis | |
| 5,386,564 A | 1/1995 | Shearer et al. | |
| 5,392,390 A | 2/1995 | Crozier | |
| 5,572,643 A | 11/1996 | Judson | |
| 5,581,749 A | 12/1996 | Hossain et al. | |
| 5,600,834 A | 2/1997 | Howard | |
| 5,613,012 A | 3/1997 | Hoffman et al. | |
| 5,623,601 A | 4/1997 | Vu | |

(Continued)

FOREIGN PATENT DOCUMENTS

| | | | |
|---|---|---|---|
| EP | 1828932 A1 | 9/2007 | |
| EP | 1846843 A1 | 10/2007 | |

(Continued)

OTHER PUBLICATIONS

Lotus Development Corporation, Lotus Quick Reference for SmartIcons, Lotus Notes Release 3.1.

(Continued)

*Primary Examiner* — Chris Parry
*Assistant Examiner* — Alan S Chou
(74) *Attorney, Agent, or Firm* — NK Patent Law, PLLC

(57) ABSTRACT

Synchronization of data items between parties A and B. A maintains copies of data items and an A change count and a B change count for each data item. The A change count indicates the number of changes made by A, and the B change count indicates the number of changes made by B and known to A. After a synchronization trigger, A sends to B each data item that A has changed, plus the A change count and the B. change count for each sent data item. A receives from B each data item that B has changed, plus the A change count and the B change count for each received data item. A detects a conflict if the received A change count differs from the maintained A change count.

17 Claims, 2 Drawing Sheets

(56) References Cited

U.S. PATENT DOCUMENTS

| | | | |
|---|---|---|---|
| 5,627,658 A | 5/1997 | Connors et al. | |
| 5,630,081 A | 5/1997 | Rybicki et al. | |
| 5,634,053 A | 5/1997 | Noble et al. | |
| 5,647,002 A | 7/1997 | Brunson | |
| 5,652,884 A | 7/1997 | Palevich | |
| 5,666,553 A | 9/1997 | Crozier | |
| 5,680,542 A | 10/1997 | Mulchandani et al. | |
| 5,682,524 A | 10/1997 | Freund et al. | |
| 5,684,990 A | 11/1997 | Boothby | |
| 5,701,423 A | 12/1997 | Crozier | |
| 5,704,029 A | 12/1997 | Wright, Jr. | |
| 5,706,502 A | 1/1998 | Foley et al. | |
| 5,710,918 A | 1/1998 | Lagarde et al. | |
| 5,713,019 A | 1/1998 | Keaten | |
| 5,715,403 A | 2/1998 | Stefik | |
| 5,717,925 A | 2/1998 | Harper et al. | |
| 5,721,908 A | 2/1998 | Lagarde et al. | |
| 5,721,914 A | 2/1998 | DeVries | |
| 5,727,202 A | 3/1998 | Kucala | |
| 5,729,735 A | 3/1998 | Meyering | |
| 5,745,360 A | 4/1998 | Leone et al. | |
| 5,752,246 A | 5/1998 | Rogers et al. | |
| 5,757,916 A | 5/1998 | MacDoran et al. | |
| 5,758,150 A | 5/1998 | Bell et al. | |
| 5,758,354 A | 5/1998 | Huang et al. | |
| 5,758,355 A | 5/1998 | Buchanan | |
| 5,765,171 A | 6/1998 | Gehani et al. | |
| 5,778,346 A | 7/1998 | Frid-Nielsen et al. | |
| 5,787,441 A | 7/1998 | Beckhardt | |
| 5,790,425 A | 8/1998 | Wagle | |
| 5,790,790 A | 8/1998 | Smith et al. | |
| 5,799,318 A | 8/1998 | Cardinal et al. | |
| 5,806,074 A | 9/1998 | Souder et al. | |
| 5,832,483 A | 11/1998 | Barker | |
| 5,857,201 A | 1/1999 | Wright, Jr. et al. | |
| 5,870,759 A | 2/1999 | Bauer et al. | |
| 5,909,689 A | 6/1999 | Van Ryzin | |
| 5,924,096 A | 7/1999 | Draper et al. | |
| 5,943,676 A | 8/1999 | Boothby | |
| 5,961,590 A | 10/1999 | Mendez et al. | |
| 5,968,131 A | 10/1999 | Mendez et al. | |
| 5,978,933 A | 11/1999 | Wyld et al. | |
| 6,006,274 A | 12/1999 | Hawkins et al. | |
| 6,023,708 A | 2/2000 | Mendez et al. | |
| 6,044,381 A | 3/2000 | Boothby et al. | |
| 6,081,806 A | 6/2000 | Chang et al. | |
| 6,085,192 A | 7/2000 | Mendez et al. | |
| 6,131,096 A | 10/2000 | Ng et al. | |
| 6,131,116 A | 10/2000 | Riggins et al. | |
| 6,138,124 A | 10/2000 | Beckhardt | |
| 6,141,664 A | 10/2000 | Boothby | |
| 6,151,606 A | 11/2000 | Mendez | |
| 6,173,312 B1 | 1/2001 | Atarashi | |
| 6,182,121 B1 * | 1/2001 | Wlaschin | 709/215 |
| 6,212,529 B1 | 4/2001 | Boothby et al. | |
| 6,223,187 B1 | 4/2001 | Boothby et al. | |
| 6,233,341 B1 | 5/2001 | Riggins | |
| 6,243,705 B1 | 6/2001 | Kucala | |
| 6,324,542 B1 | 11/2001 | Wright, Jr. et al. | |
| 6,487,560 B1 * | 11/2002 | LaRue et al. | 707/625 |
| 6,493,727 B1 | 12/2002 | Huang et al. | |
| 6,516,314 B1 | 2/2003 | Birkler et al. | |
| 6,694,335 B1 | 2/2004 | Hopmann et al. | |
| 6,708,221 B1 | 3/2004 | Mendez et al. | |
| 6,799,190 B1 | 9/2004 | Boothby | |
| 6,925,477 B1 | 8/2005 | Champagne et al. | |
| 7,346,616 B2 * | 3/2008 | Ramanujam et al. | 707/610 |
| 7,430,609 B2 | 9/2008 | Brown | |
| 2002/0069298 A1 | 6/2002 | Birkler et al. | |
| 2003/0078880 A1 | 4/2003 | Alley | |
| 2003/0097381 A1 * | 5/2003 | Detweiler et al. | 707/201 |
| 2003/0130984 A1 * | 7/2003 | Quinlan et al. | 707/1 |
| 2003/0172070 A1 | 9/2003 | Sawadsky et al. | |
| 2004/0006551 A1 | 1/2004 | Sahinoja et al. | |
| 2004/0010510 A1 | 1/2004 | Hotti | |
| 2004/0024795 A1 * | 2/2004 | Hind et al. | 707/204 |
| 2004/0139235 A1 | 7/2004 | Rashid et al. | |
| 2004/0147262 A1 | 7/2004 | Lescuyer | |
| 2004/0176128 A1 | 9/2004 | Grabelsky | |
| 2004/0230619 A1 * | 11/2004 | Blanco et al. | 707/200 |
| 2004/0260761 A1 | 12/2004 | Leaute et al. | |
| 2005/0015432 A1 | 1/2005 | Cohen | |
| 2005/0071194 A1 * | 3/2005 | Bormann et al. | 705/2 |
| 2005/0086540 A1 | 4/2005 | Gunter et al. | |
| 2005/0099963 A1 * | 5/2005 | Multer et al. | 370/254 |
| 2005/0278641 A1 | 12/2005 | Mansour et al. | |
| 2006/0026580 A1 | 2/2006 | Cabillic et al. | |
| 2006/0036580 A1 * | 2/2006 | Stata et al. | 707/3 |
| 2006/0048061 A1 | 3/2006 | Forlenza et al. | |
| 2006/0063544 A1 | 3/2006 | Zhao et al. | |
| 2006/0074951 A1 * | 4/2006 | Beier et al. | 707/100 |
| 2006/0149970 A1 | 7/2006 | Imazu | |
| 2006/0184591 A1 | 8/2006 | Backholm et al. | |
| 2006/0200583 A1 | 9/2006 | Le Lann et al. | |
| 2008/0201362 A1 * | 8/2008 | Multer et al. | 707/103 |

FOREIGN PATENT DOCUMENTS

| | | |
|---|---|---|
| FI | 20045472 A | 6/2006 |
| FI | 120165 B | 7/2009 |
| FI | 121900 B | 5/2011 |
| WO | WO 98/24257 | 6/1998 |
| WO | WO 03/098890 A1 | 11/2003 |
| WO | WO 2004-045171 A1 | 5/2004 |
| WO | WO 2004/071049 A1 | 8/2004 |
| WO | WO 2006/061463 A1 | 6/2006 |
| WO | WO 2006/070071 A1 | 7/2006 |

OTHER PUBLICATIONS

Lotus Development Corporation, Lotus Quick Reference for Windows and Presentation Manager, Lotus Notes Release 3.
Lotus Development Corporation, Lotus Quick Reference for Macintosh, Lotus Notes Release 3.0.
Lotus Development Corporation, Lotus Quick Reference for Application Developer's, Lotus Notes Release 3.
Lotus Development Corporation, Lotus Customer Support Service, Lotus Notes Customer Support Guides.
Lotus Software Agreement for "Notes 4.0 NA DKTP Client UPG", Part No. 38985.
Lotus Development Corporation, Lotus Notes 3.3, Lotus Customer Support, North American Guide, 29 pages.
Lotus Development Corporation, Lotus Notes 4.0, Lotus Customer Support, North American Guide, 29 pages.
Lotus Development Corporation, Lotus Notes 4.1 Starter Pack, Lotus Customer Support, North American Guide, 51pages.
Lotus Development Corporation, "Lotus Script Classes for Notes Release 4",6 pages.
Allchin, James E., "An Architecture for Reliable Decentralized Systems", UMI Dissertation Services, Copyright 1983.
Lotus Development Corporation, Lotus Notes Release 3.1. The Groupware Standard, Administrator's Guide—Server for NetWare, OS/2, and UNIX,1989.
Lotus Development Corporation, Lotus Notes Release 3.1: The Groupware Standard, Site and Systems Planning Guide, 1991.
Wilcox, Adam A., PC Learning Labs Teaches Lotus Notes 3.0: The Quick and Easy Way to Learn, Ziff-Davis Press, 1993.
Lotus Development Corporation, Lotus Notes Release 3.3: Start Here, Workstation Install for Windows, OS/2 and Macintosh, 1993.
Lotus Development Corporation, Lotus Notes Release 3.1: Administrator's Guide—Server for Windows, 1993.
Lotus Development Corporation, Lotus Notes Release 3.1: The Groupware Standard, Customer Services Application Guide, 1994.
Lotus Development Corporation, Lotus Notes Release 3.1: The Groupware Standard, Getting Started with Application Development, 1994.
Lotus Development Corporation, Lotus Notes Release 3.1: The Groupware Standard, Network Driver Documentation, 1994.
Komblith, Polly R., Lotus Notes Answers: Certified Tech Support, Covers Lotus Notes Release 3, Osborne McGraw-Hill, 1994.

(56) References Cited

OTHER PUBLICATIONS

Freeland, Pat and Londergan, Stephen, Lotus Notes 3/3.1 for Dummies TM, IDG Books Worldwide, 1994.
Gewirtz, David, Lotus Notes 3 Revealed! Your Guide to Managing Information and Improving Communication Throughout Your Organization, Prima Publishing, 1994.
Shafran, Andrew B., Easy Lotus Notes for Windows™, Que® Corporation,1994.
Lotus Development Corporation, Lotus Notes Release 3.3: The Groupware Standard, Administration, 1994.
McMullen, Melanie, Editor, Network Remote Access and Mobile Computing, Miller Freeman Inc., 1994.
Lotus Development Corporation, Lotus Notes: The Groupware Standard-Windows, 1994.
IntelliLink Corporation, IntelliLink® for Windows User's Guide, Version 3.0, 1994.
Lotus Development Corporation, Lotus Notes Release 4: InterNotes Web Navigator Administrator's Guide, 1995.
Lotus Development Corporation, Lotus InterNotes Release 4 Web Publisher: InterNotes Web Publisher Guide, 1995.
Lotus Development Corporation, Lotus Notes Release 4 Install Guide for Servers, 1995.
Lotus Development Corporation, Lotus Notes Release 4.1 Release Notes,1995.
Lotus Development Corporation, Lotus Notes Release 4 Migration Guide,1995.
Lotus Development Corporation, Lotus Notes Release 4 Database Manager's Guide, 1995.
Lotus Development Corporation, Lotus Notes Release 4 Install Guide for Workstations, 1995.
Lotus Development Corporation, Lotus Step by Step: A Beginner's Guide to Lotus Notes, 1995.
Lotus Development Corporation, Lotus Notes Release 4 Programmer's Guide Part 1995.
Lotus Development Corporation, Lotus Notes Release 4 Administrator's Guide, 1995.
Lotus Development Corporation, Lotus Notes Release 4 Deployment Guide,1995.
Lotus Development Corporation, Lotus Notes Knowledge Base, "Lotus NotesPump: Database Integration for Lotus Notes", Oct. 31, 1995.
Lotus Development Corporation, Lotus Notes Knowledge Base, "How to Set Up "Firewall"Protection for a Notes Domain", Nov. 6, 1995.
Balaban, Bob, "This is Not Your Father's Basic: LotusScript in Notes Release 4", Lotus Notes Advisor, Advisor Publications, vol. 1, No. 5, Nov./Dec. 1995, pp. 31-58.
Pyle, Lisa, "A Jump Start to the Top Ten R3-to-R4 Migration Considerations", Lotus Notes Advisor, Advisor Publications, vol. 1, No. 5, Nov./Dec. 1995, pp. 3-20.
Lotus Notes Advisor, Advisor Publications, Dec. 1995, entire magazine.
Lotus Development Corporation, Lotus Notes Release 4 Install Guide for Workstations, First Revision, 1996.
Lotus Development Corporation, Lotus Step by Step: A Beginner's Guide to Lotus Notes, First Revision, 1996.
Freeland, Pat and Londergan, Stephen, Lotus Notes Release 4 for Dummies™, IDG Books Worldwide, 1996.
Kreisle, Bill, Teach yourself . . . Lotus Notes 4, MIS: Press, 1996.
Marmel, Elain, Easy Lotus® Notes Release 4.0, Que Corporation, 1996.
Lotus Development Corporation, Lotus Notes Server Up and Running!, Release 4, 1996.
Falkner, Mike, "How to Plan Develop, and Implement Lotus Notes in Your Organization", Wiley Computer Publishing, John Wiley and Sons, Inc.,1996.
Lamb, John P., et al., "Lotus Notes Network Design", McGraw-Hill, 1996.
Tamura, Randall A., et al., Lotus Notes 4 Unleashed, Sams Publishing, 1996.
Dahl, Andrew, Lotus Notes 4 Administrator's Survival Guide, Sams Publishing, 1996.
Netscape Communications Corporation, Administrator's Guide, Netscape News Server, Version 2.0, 1996.
Lotus Development Corporation, Lotus Notes Internet Cookbook for Notes Release 3, Jan. 16, 1996.
Wong, Harry, "Casahl's Replic-Action: Delivering True Notes/DBMS Integration", The View Technical Journal for Lotus Notes®. Software,. vol. 2, Issue 1, Jan./Feb. 1996, pp. 33-50.
Lotus Development Corporation, Lotus Notes Release 4 Application Developer's Guide, 1995.
Lotus Development Corporation, Lotus Notes Release 4 InterNotes Web Navigator User's Guide, 1995.
Lotus Development Corporation, Lotus Notes Release 4 Release Notes,1995.
Lotus Development Corporation, Lotus Notes Release 4.5 Install Guide for Workstations, 1995.
Lotus Development Corporation, Release Notes, Lotus Notes Release 3.30,Windows, OS/2, and Macintosh, 1995.
Brown, Kevin, et al., Mastering Lotus® Notes™ SYBEX Inc., 1995.
Lotus Development Corporation, Lotus Notes Release 4.5, Network Configuration Guide, 1995.
Netscape Communications Corporation, Installation Guide, Netscape Mail Server, Version 2.0 for Unix, 1995.
Netscape Communications Corporation, User's Guide, Netscape Mail Server, Version 2.0, 1995.
Netscape Communications Corporation, Administrator's Guide, Netscape Mail Server, Version 2.0, 1995.
Pyle, Hugh, "The Architecture of Lotus Notes", Lotus Notes Advisor, Advisor Publications, Premiere Issue 1995, pp. 18-27.
Lotus Notes Advisor, Advisor Publications, Jun. 1995, entire magazine.
IBM, "The Architecture of Lotus Notes", White Paper, No. 114654,modified date: May 31, 1995.
Lotus Development Corporation, Lotus Notes Knowledge Base, "What is the Notes Replicator", Jul. 5, 1995.
Lotus Notes Advisor, Advisor Publications, Aug. 1995, entire magazine.
Grous, Paul J., "Creating and Managing a Web Site with Lotus' InterNotes Web Publisher", The View Technical Journal for Lotus Notes® Software, vol. 1, Issue 4, Sep./Oct. 1995,pp. 3-18.
Lotus Notes Advisor, Advisor Publications, Oct. 1995,entire magazine.
Cole, Barb, "Lotus airs Notes-to-database integration tool", www.looksmart.com, Oct. 2, 1995.
Lotus Development Corporation, Lotus Notes Knowledge Base, "Lotus Announces Lotus NotesPump 1.0", Oct. 31, 1995.
Lotus Development Corporation, Lotus Notes Knowledge Base, "Lotus NotesPump 1.0 Q & A", Oct. 31, 1995.
Lotus Notes Advisor, Advisor Publications, Jan./Feb. 1996, entire magazine.
IBM International Technical Support Organization, Lotus Notes Release 4 in a Multiplatform Environment, Feb. 1996.
Lotus Development Corporation, Lotus Notes Internet Cookbook for Notes Release 4, Feb. 14, 1996.
Blaney, Jeff, "You *Can* Take it with you: An Introduction to Mobile Computing with Notes R4", The View Technical Journal for Lotus Notes® Software, vol. 2, Issue 1, Jan./Feb. 1996, pp. 22-32.
Lotus Notes Advisor, Advisor Publications, Apr. 1996, entire magazine.
Frankel, Garry, "Pumping for Info: Notes and Database Integration", Network Computing, May 1, 1996, pp. 76-84.
Lotus Development Corporation, Lotus Notes Knowledge Base, "Firewall Security Overview and How Firewalls Relate to Lotus Notes", May 22, 1996.
Lotus Notes Advisor, Advisor Publications, Jun. 1996, entire magazine.
Augun, Audry, "Integrating Lotus Notes with Enterprise Data", Lotus Notes Advisor, Advisor Publications, Jul./Aug. 1996, pp. 22-25.
Lotus Notes Advisor, Advisor Publications, Aug. 1996, entire magazine.

(56) References Cited

OTHER PUBLICATIONS

IBM Corporation, Secrets to Running Lotus Notes: The Decisions No One Tells You How to Make, Oct. 1996.
Lotus Notes Advisor, Advisor Publications, Oct. 1996, entire magazine.
Opyt, Barbara, et al., "Use the Internet as Your Lotus Notes WAN", Lotus Notes Advisor, Advisor Publications, Nov./Dec. 1996, pp. 17-20.
Lotus Notes Advisor, Advisor Publications, Dec. 1996, entire magazine.
Swedeen, Bret, et al., "Under the Microscope: Domino Replication", LDD Today, Oct. 1, 1998.
Lotus Development Corporation, Lotus Inside Notes: The Architecture of Notes and the Domino Server, 2000.
"The History of Notes and Domino", Lotus Developer Domain, Lotus, Sep. 29, 2003.
Overview: What is Lotus Notes Pump.
NotesPump 1.0 Release Notes.
Lotus Notes-Notes Administration Help screen shot.
Chapter 13-1, publication unknown, "Anatomy of a Note ID".
Chapter: About NotesPump.
European Patent Application No. EP 05817671.0, Supplementary European Search Report, 6 pages, Feb. 5, 2008.
European Patent Application No. EP 05818838.4, Supplementary European Search Report, 6 pages, Jan. 18, 2008.
International Application No. PCT/FI2005/050452, International Search Report, 3 pages, Mar. 8, 2006.
International Application No. PCT/FI2005/050480, International Search Report, 4 pages, Mar. 17, 2006.

\* cited by examiner

DATABASE SYNCHRONIZATION

CROSS-REFERENCE TO RELATED APPLICATIONS

This application relies for priority upon Finnish Application No. 20045472, filed Dec. 10, 2004, as well as U.S. Provisional Application No. 60/651,080, filed Feb. 9, 2005, the contents of both of which are incorporated herein by reference in their entireties.

BACKGROUND OF THE INVENTION

The invention relates to methods and equipment for synchronizing a database between two parties. In a very common but non-restricting application, one party is a desktop computer, while the other one is a portable computer, a pocket computer or a "smart" telephone. In most applications each party contains its own data processor, but the invention is also usable in applications in which a single data processor synchronizes data items between two data storages, and the parties may be construed as processes executing in a single processor. The database contains data items, such as documents or calendar events, that can be changed at either party. As commonly used in the context of databases, synchronization means reducing or eliminating differences between the database copies maintained at the parties, which are supposedly similar but at least one database contains changed data items which are not reflected in the other database.

It is well known to provide data items with timestamps that indicate the time of the latest change. Graphical user interfaces use a 'drag and drop' metaphor with which a user may drag a set of files from one location to another such that the more recent versions of the files replace the older ones. Synchronization between two folders can be achieved by performing the 'drag and drop' operation in both directions. But the timestamp-based synchronization cannot be used if the data items do not have timestamps. A further problem is that if the parties' clocks are offset in relation to each other, an older version of a data item may accidentally overwrite a more recent one.

BRIEF DESCRIPTION OF THE INVENTION

An object of the present invention is to provide a method and an apparatus for implementing the method so as to solve the above problems. The objects of the invention are achieved by a method and an arrangement which are characterized by what is stated in the independent claims. The preferred embodiments of the invention are disclosed in the dependent claims.

An aspect of the invention is a method for synchronizing a database between an A party and a B party. Another aspect of the invention is an apparatus adapted to act as one of the parties in the method. Yet another aspect of the invention is a computer program product that causes a data processor to carry out the method when the program product is executed.

The invention is based on the idea that each party maintains two change counts per data item. A first change count keeps track of changes to the data item by the party itself, while the second change count keeps track of changes to the data item by its peer, ie, the other party. At each synchronization event, either party sends its peer the data items it has changed after the previous synchronization event plus the two change counts. The sent change counts tell the other party how many changes the party has made and how many peer changes the party is aware of. Either party detects a conflict if the count of changes by the party, as maintained by its peer, differs from the corresponding change count as maintained by the party itself. Such a difference in change counts serves as an indication that the data item received from the peer did not reflect all changes made by the party that detects the conflict.

In a variant of the above inventive idea, each party may send its peer an identifier of each data item it has changed, plus the two change counts. By comparing the received change counts with the corresponding change counts maintained locally, the parties can determine which data items have been changed after the latest synchronization, and request the transmission of the changed data items separately. The two techniques can be summarized by saying that each party sends its peer an indication of a data item it has changed, plus the two change counts. The indication may be an identifier of the data item or the data item itself.

In addition to the two change counts per party, it is beneficial to maintain some record-keeping of which data items have been changed after the latest synchronization, whereby only the changed data items need to be synchronized. For example, such a record-keeping can be based on time stamps of data items that are compared with the time of the latest synchronization. Alternatively, the record-keeping can be based on a one-bit flag, which is marked "changed" when the data item is changed and "unchanged" when the data items are synchronized.

As an alternative to the record-keeping of data items changed after the latest synchronization, the parties may send changed data items or indications thereof immediately, if this is possible. In some implementations, one application (such as a calendar application) may be responsible for changing the data items (calendar events), while a separate application (a communications application or protocol layer) is responsible for actually sending the changed data items.

An advantage of the method and arrangement of the invention is that synchronization of data items is possible without providing each data item with a data stamp. A further advantage is that synchronization is possible even if the parties' clocks are offset in relation to each other.

The invention is particularly suitable in mobile applications because a party receiving a changed data item does not have to acknowledge the reception of received data item. The party sending the changed data item can determine from the next pair of change counts if its peer actually received the changed data item.

BRIEF DESCRIPTION OF THE DRAWINGS

In the following the invention will be described in greater detail by means of preferred embodiments with reference to the drawings, in which.

DETAILED DESCRIPTION OF PREFERRED EMBODIMENTS

Figure 1:
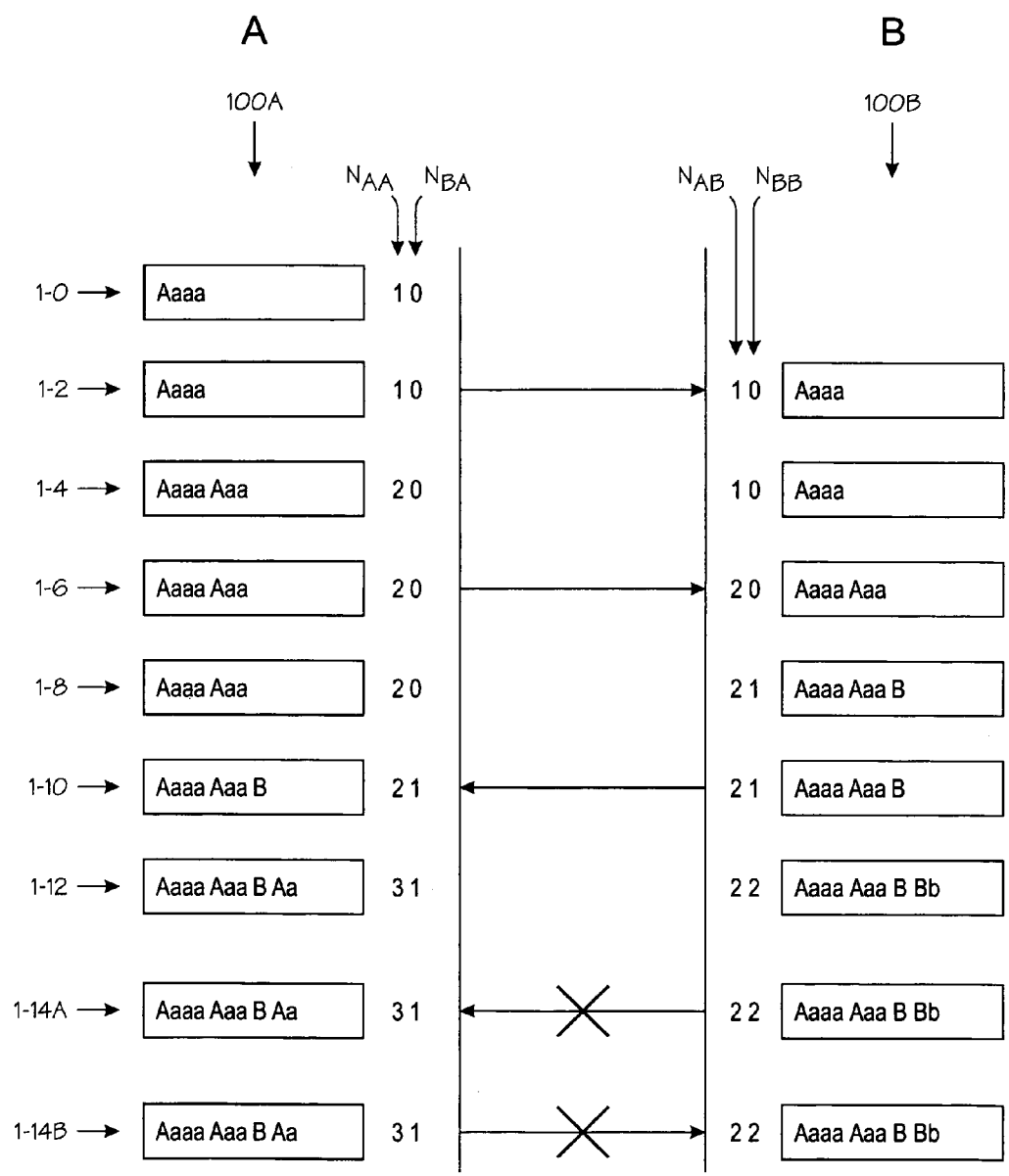
FIG. 1 shows a hypothetical set of events in a synchronization process according to the invention.

FIG. 1 shows a hypothetical set of events in a synchronization process according to the invention. The left-hand side of FIG. 1 relates to the A party, while the right-hand side relates to the B party. Reference numerals 100A and 100B denote copies (versions) of a data item at the A and B party, respectively.

In step 1-0 a new data item 100A, such as an electronic document or calendar event, is created at the A party. At this time the data item does not yet exist at the B party. In step 1-2 the A party detects a synchronization trigger and sends the data item 100A to the B party. The synchronization trigger may be the simultaneous existence of a changed (in this case: newly-created) data item and a data connection between the parties. Both parties maintain two change counts that relate to the data item. The change counts are denoted by the following reference signs:

$N_{AA}$, number of changes made by A, as seen by A;
$N_{BA}$, number of changes made by B, as seen by A;
$N_{AB}$, number of changes made by A, as seen by B; and
$N_{BB}$, number of changes made by B, as seen by B.

In the embodiment shown in FIG. 1, the creation of the data item is considered a change, which is why after steps 1-0 and 1-2 the change counts $N_{AA}$ and $N_{AB}$ have a value of '1'. However, the invention operates equally well if the initial creation of a data item is not considered a change and the change counts begin at zero.

In step 1-4 the A party changes the data item 100A. Synchronization does not take place immediately, possibly because a data connection between the parties does not exist. The $N_{AA}$ change count is '2' because A knows it has changed the data item twice. The $N_{AB}$ change count remains at '1' because B is not yet aware of the latest change.

In step 1-6 the data item is again synchronized. In other words, A sends to B the data item 100A and the $N_{AA}$ and $N_{BA}$ change counts. B compares the received data counts with the respective data counts $N_{AB}$ and $N_{BB}$ maintained at the B party. Since $N_{AA}$='2' and $N_{AB}$='1', B detects that the data item has been changed by A after the previous synchronization. B can accept the changed data item because the $N_{BA}$ change count equals the $N_{BB}$ change count (both are zeros).

In step 1-8 the B party changes its copy 100B of the data item. In the interest of clarity, the A and B parties respectively add letters 'A' and 'B', in upper or lower case, to the data item. Since this is B's first change to the data item, B also changes the $N_{BB}$ change count to '1'. The $N_{BA}$ change count remains at '0' because A is not yet aware of the change made by B.

In step 1-8 the data item is again synchronized. B sends to A the data item 100B and the $N_{AB}$ and $N_{BB}$ change counts. A compares the received data counts with the respective data counts $N_{AA}$ and $N_{BA}$ maintained at the A party. Since $N_{BB}$='1' and $N_{BA}$='0', the A party detects that the data item has been changed by B after the previous synchronization in step 1-6. A can accept the changed data item because the $N_{AB}$ change count equals the $N_{AA}$ change count (both have a value of '2').

In step 1-12 both parties A and B change their respective copies 100A and 100B of the data item and the change counts. The A party increments the $N_{AA}$ change count to '3', while B increments the $N_{BB}$ change count to '2'. But neither party is yet aware of the changes made by its peer.

Reference numeral 1-14A describes a situation in which B attempts to send the data item 100B to A. B also sends the $N_{AB}$ and $N_{BB}$ change counts. A compares the received data counts with the respective data counts $N_{AA}$ and $N_{BA}$ maintained at the A party. Since $N_{BB}$='2' and $N_{BA}$='1', A detects that the data item has been changed by B after the previous synchronization. But A cannot accept the changed data item because the received $N_{AB}$ change count (with a value of '2') is lower than the locally maintained $N_{AA}$ change count (with a value of '3'). Thus A detects a conflict if the $N_{AB}$ change count (count of changes made by A and known to B) is lower than the $N_{AA}$ change count, ie, the corresponding change count maintained by A itself. In such a situation, A detects that the data item sent by B did not include all the changes made by A, and if A accepted the data item, some of the changes made by A would be lost. The big 'X' over the arrow in step 1-14A signifies the fact that A does not accept the changed data item, at least not without some conflict resolution. For the purposes of FIG. 1, it is assumed that A rejects the data item sent by B.

Reference numeral 1-14B describes a situation in which A attempts to send the data item 100A to B. The situation is symmetrical to the previously described situation 1-14A. In this case B detects a conflict because the change count $N_{BA}$ (with a value of 1) received from A is lower than the corresponding change count $N_{BB}$ (with a value of 2) maintained by B itself. Thus B detects that the data item sent by A did not include all the changes made by B.

In the scenario shown in FIG. 1, it was assumed that in the synchronization events 1-6 and 1-10, the changed data items 100A and 100B were sent with the change counts. It is also possible to send only an identifier of a changed data item, whereby the party receiving the change counts will compare the received change counts with their locally maintained counterparts and request the actual data item only if it has been changed.

Figure 2:
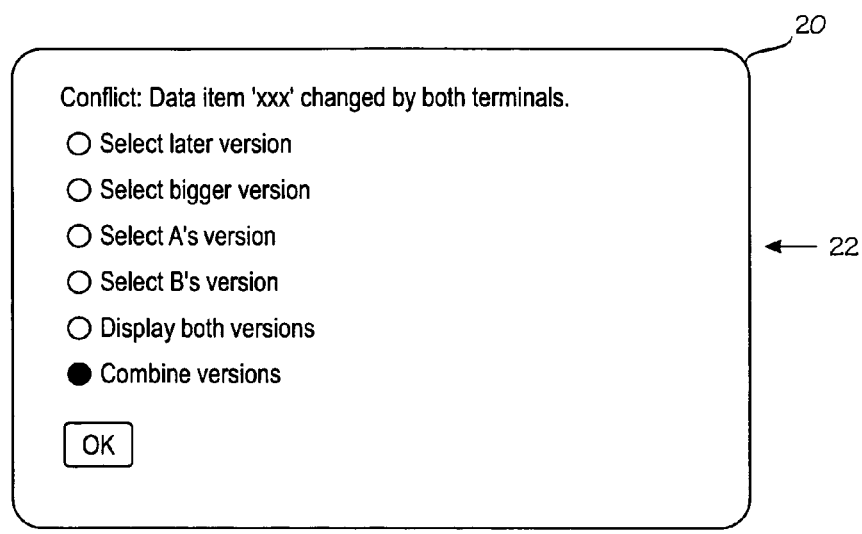
FIG. 2 shows a user interface screen for user-assisted conflict resolution.

FIG. 2 shows a user interface screen for user-assisted conflict resolution. In step 1-12 of FIG. 1, the copies 100A and 100B of the data item was changed by both parties A and B when synchronization was not possible. The synchronization attempts in step 1-14A or 1-14B caused a conflict detection as either party noted that it its peer had not been aware of all changes made to the data item.

The synchronization technique preferably comprises a set of predetermined rules for conflict resolution. The applicable rules may be displayed for user selection, or they may be selected by some predetermined criteria that may, for example, be based on the type of the data item.

FIG. 2 shows a user interface screen 20. Reference numeral 22 denotes a menu of the applicable rules. For example, the user may select to select the more recent copy of the data items 100A and 100B, assuming that each data item has a time stamp. Alternatively, the user may select the bigger version, or one version (A's or B's) explicitly. Or, the user may opt to display both versions simultaneously and made the selection after seeing both versions. Finally, the user may opt to combine the versions of the data items.

Figure 3:
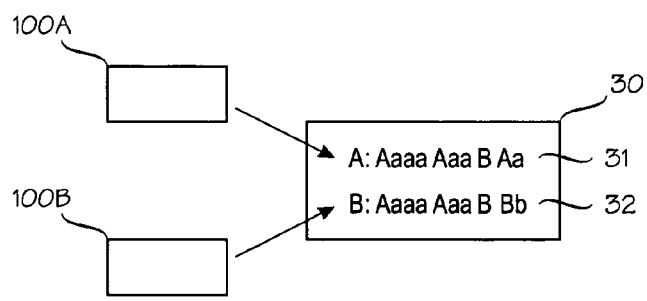
FIG. 3 shows a combination of data items in a conflict situation.

FIG. 3 shows a combined data item 30. Reference numerals 31 and 32 respectively denote data obtained from the A party (version 100A) and the B party (version 100B).

Instead of presenting the applicable rules for user selection, the party that detects the conflict may select one of the rules automatically, preferably on the basis of the type of the data item. For example, if the data items are calendar events, it is relatively safe to assume that the newer one is to replace the older one. If the data items are word processing documents, the documents may be combined for later editing by the user.

It will be apparent to a person skilled in the art that, as the technology advances, the inventive concept can be implemented in various ways. The invention and its embodiments are not limited to the examples described above but may vary within the scope of the claims.

I claim:

1. A method for synchronizing a first data storage and a second data storage, the method comprising:
    maintaining by a processor a first change count and a
        second change count for a data item a first data storage,
        wherein the first change count maintained the processor
        indicates a number of changes made to the data item at
        the first data storage, wherein the second change count maintained by the processor indicates a number of changes made to a corresponding data item at a second data storage; and responsive to a synchronization trigger that is generated when the data item is changed and a data connection is available:

receiving an identifier for the changed data item along with a first change count and a second change count maintained at the second data storage;

detecting a conflict in the data item between the first and second data storages based on the maintained first and second change counts and the received first and second change counts; and resolving the conflict according to a set of predetermined rules, wherein applicable rules of the set of predetermined rules are displayed as a menu on a user interface for selection by a user; and wherein one application is responsible for receiving the identifier for the changed data item and another application is responsible for the changes made to the data item at the first data storage.

2. The method of claim 1, wherein, if the data item is a document, the conflict is resolved by merging conflicting versions for subsequent editing.

3. The method of claim 2, wherein, if the data item having conflicting versions is a calendar event, the conflict is resolved by replacing an older version with a newer version of the conflicting versions.

4. The method of claim 1, wherein resolving the conflict includes displaying conflicting versions of the data item in the user interface and receiving an input from the user interface to resolve the conflict.

5. The method of claim 4, further comprising offering the conflicting versions for user selection via the user interface.

6. The method of claim 1, wherein, the first data storage and the second data storage are coupled via a mobile communication network.

7. The method of claim 1, further comprising:

sending an indication that the data item in the first data storage has changed after the synchronization event, plus the first change count and the second change count maintained in the first data storage.

8. The method of claim 7, further comprising:

sending the first data item, and replacing the corresponding data item in the second data storage with the sent data item if:

the second change count maintained at the second data storage for the data item corresponds to the second change count maintained in the first data storage for the data item; and the first change count maintained at the second data storage for the data item does not correspond to the first change count maintained in the first data storage for the data item.

9. A system for performing a method for synchronizing a first data storage and a second data storage over a mobile communications network, the system comprising:

means for maintaining in a first data storage a first change count and a second change count for a data item in the first data storage, wherein the first change count maintained in the first data storage indicates a number of changes made to the data item in the first data storage, wherein the second change count maintained in the first data storage indicates a number of changes made to a corresponding data item maintained in a second data storage;

means for receiving an indication that the data item in the second data storage has changed after a synchronization event, the indication including an identifier of the changed data item, means for requesting the changed data item; and means for resolving a conflict detected from the first and second change counts according to a set of predetermined rules;

wherein applicable rules of the set of predetermined rules are displayed as menu selections on a user interface for selection by a user; and wherein one application is responsible for receiving an indication that the data item in the second data storage has changed and another application is responsible for the changes made to the data item at the first data storage.

10. The system of claim 9, further comprising means for displaying conflicting versions of the data item in the user interface.

11. The system of claim 10, further comprising means fir offering the set of user selectable options for manipulating the conflicting versions of the data item to resolve the conflict.

12. The system of claim 10, wherein, if the data item having conflicting versions is a calendar event, the conflict is resolved by replacing an older version with a newer version of the conflicting versions; wherein, if the data item is a document, the conflict is resolved by merging the conflicting versions for subsequent editing.

13. The system of claim 9, further comprising means for connecting the first data storage to the second data storage via the mobile communication network.

14. The system of claim 9, further comprising, means for receiving, after the latest synchronization event, a first change count maintained in the second data storage for the data item, wherein the first change count maintained in the second data storage indicates a number of changes made to the data item maintained at the first data storage.

15. The system of claim 14, wherein the conflict is detected from the first change count maintained in the second data storage and the first change count maintained in the first data storage.

16. The system of claim 9, further comprising, means for receiving, after the latest synchronization event, a second change count maintained at the second data storage for each received data item, wherein the second change count maintained at the second data storage indicates a number of changes made to the data item at the second data storage.

17. An apparatus for synchronizing a first data storage and a second data storage, the apparatus comprising:

a memory configured to:

maintain a first change count and a second change count for each data item in a first data storage, wherein the first change count indicates a number of changes made to the data item in the first data storage, wherein the second change count indicates a number of changes made to a corresponding data item in a second data storage;

a processor configured to execute instructions to:

detect a conflict in the data item between the first and second data storages based on the first and second change counts, in response to a synchronization trigger; and resolve the conflict according to a set of predetermined rules, wherein applicable rules of the set of predetermined rules are displayed as menu selections on a user interface for selection by a user; and wherein one application is responsible for receiving an indication that the data item in the second data storage has changed and another application is responsible for the changes made to the data item in the first data storage.

* * * * *